(12) United States Patent
Houssat et al.

(10) Patent No.: US 10,583,811 B2
(45) Date of Patent: Mar. 10, 2020

(54) CONNECTOR AND WIPER DEVICE FOR ASSEMBLING A DRIVE ARM OF A MOTOR VEHICLE TO A WINDSCREEN WIPER

(71) Applicant: Valeo Systèmes d'Essuyage, Le Mesnil Saint Denis (FR)

(72) Inventors: Stéphane Houssat, Issoire (FR); Vincent Gaucher, Issoire (FR); Eric Poton, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 304 days.

(21) Appl. No.: 15/632,643

(22) Filed: Jun. 26, 2017

(65) Prior Publication Data

US 2017/0369036 A1    Dec. 28, 2017

(30) Foreign Application Priority Data

Jun. 27, 2016 (FR) .................................... 16 55937

(51) Int. Cl.
*B60S 1/38* (2006.01)
*B60S 1/40* (2006.01)

(52) U.S. Cl.
CPC .......... *B60S 1/3849* (2013.01); *B60S 1/3853* (2013.01); *B60S 1/3867* (2013.01); *B60S 1/40* (2013.01); *B60S 1/4003* (2013.01); *B60S 1/4077* (2013.01); *B60S 1/38* (2013.01); *B60S 1/3851* (2013.01); *B60S 1/3863* (2013.01); *B60S 1/4009* (2013.01)

(58) Field of Classification Search
CPC ........ B60S 1/38; B60S 1/3849; B60S 1/3853; B60S 1/3858; B60S 1/3865; B60S 1/3867; B60S 1/40; B60S 1/4006; B60S 1/4009; B60S 1/4003; B60S 1/3801; B60S 1/3851

USPC .......................................... 15/250.32, 250.43
See application file for complete search history.

(56) References Cited

U.S. PATENT DOCUMENTS 3,416,180 A * 12/1968 Deutscher ............. B60S 1/4006
 15/250.32
2013/0192015 A1* 8/2013 Tolentino ............. B60S 1/4003
 15/250.32

FOREIGN PATENT DOCUMENTS

DE        2760318    * 6/1979
EP        0337042    * 10/1989
(Continued)

*Primary Examiner* — Gary K. Graham
(74) *Attorney, Agent, or Firm* — Osha Liang LLP

(57) ABSTRACT

The invention relates to a connector (3) for assembling a drive arm of a motor vehicle to a windscreen wiper (2), said connector (3) comprising:
  a connection device (15) designed to interact with a base (10) of a windscreen wiper (2) to reversibly secure the connector (3) to the windscreen wiper (2),
  a side interface (16) on a side wall (17) of the connection device (15), said interface (16) comprising a second transverse pin (18) designed to be connected to a drive arm,
characterized in that the connection device (15) comprises:
  a first member (26) designed to interact with a housing (11) in the base (10) of the windscreen wiper (2), the first member (26) being connected to the side wall (17) by at least one bridge (23), and
  at least one side locking tab (22a, 22b) projecting perpendicularly from the side wall (17) in the direction of the housing (11), the side locking tab (22a, 22b) being designed to interact with a side edge (24) of the windscreen wiper (2) arranged on the opposite side to the housing (11).
The present invention also relates to a wiper device.

13 Claims, 4 Drawing Sheets

(56) References Cited

FOREIGN PATENT DOCUMENTS

EP 2977279 * 1/2016
FR 2752799 * 3/1998

* cited by examiner

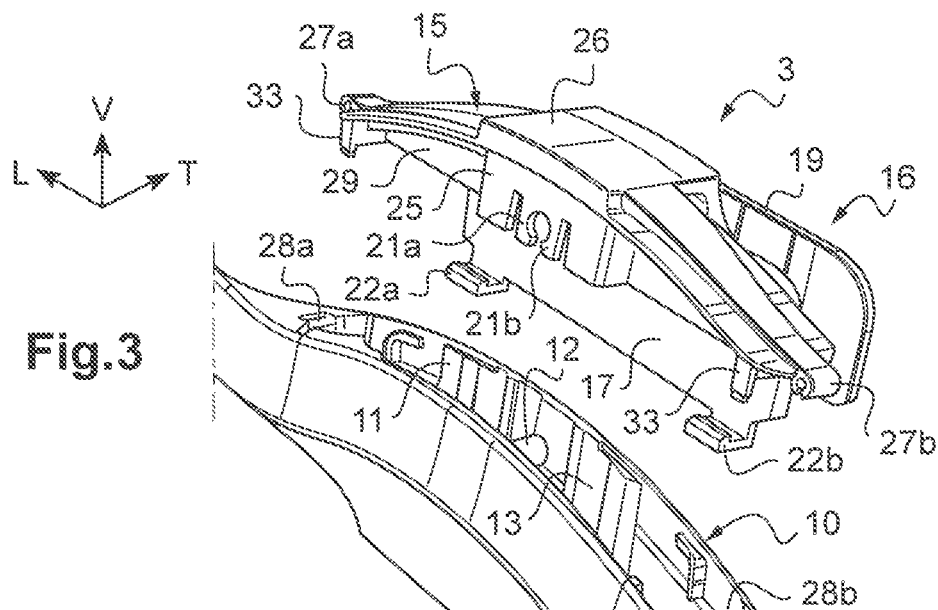
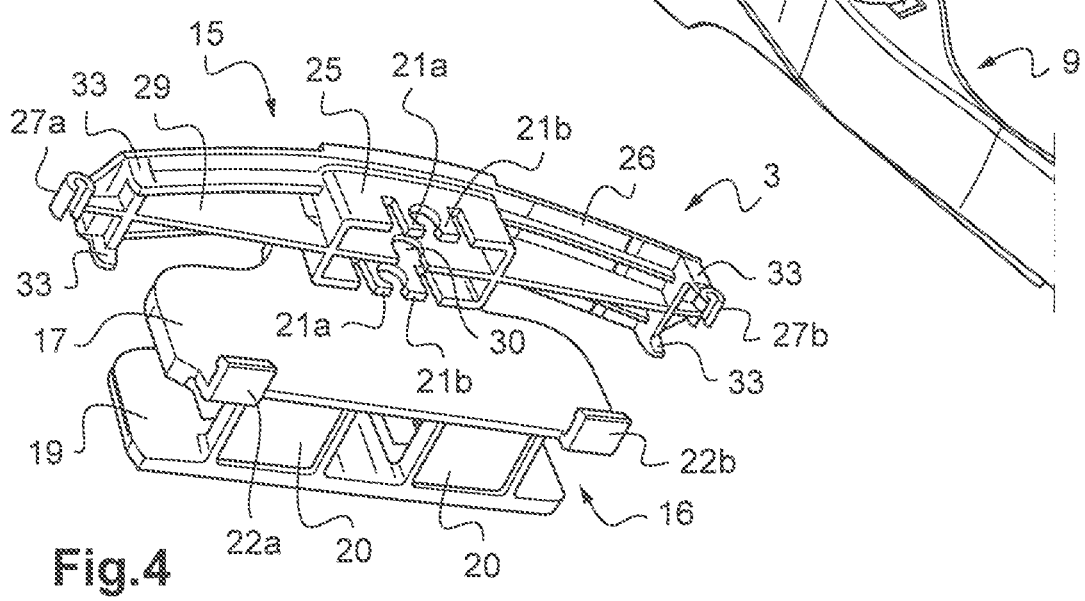
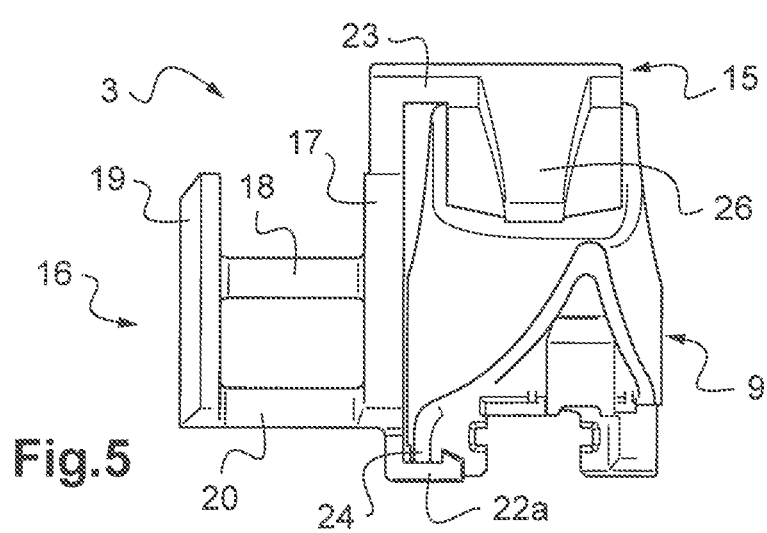

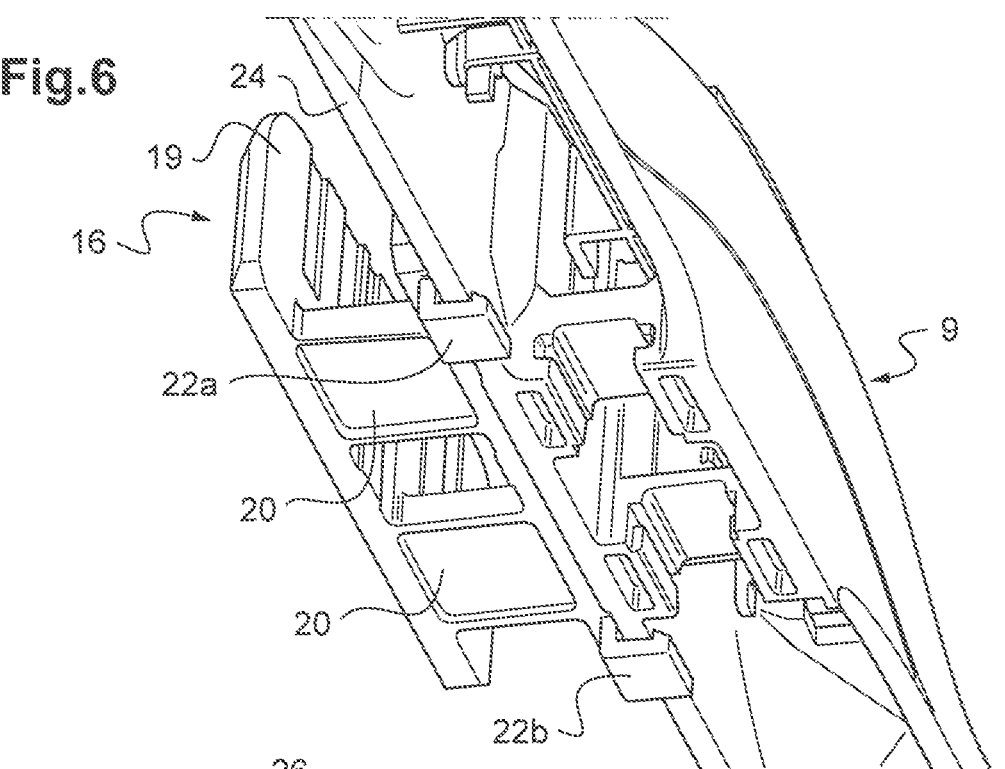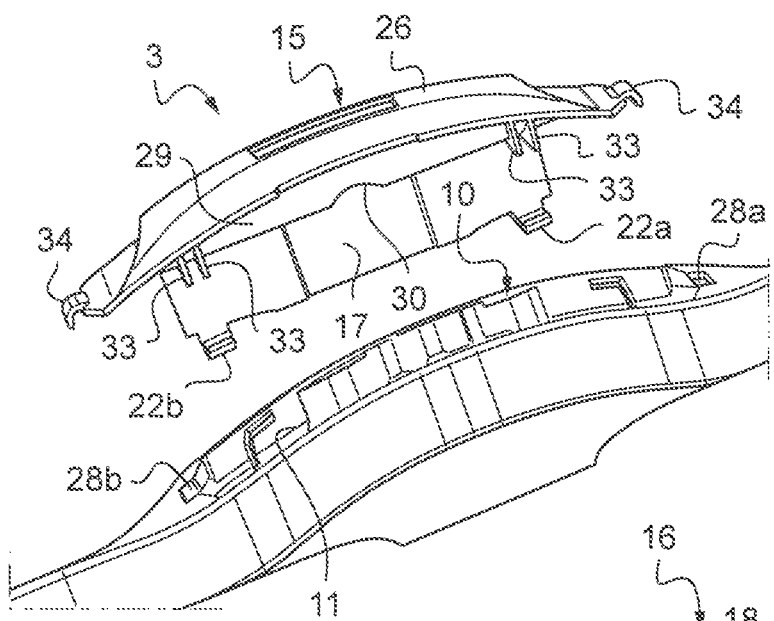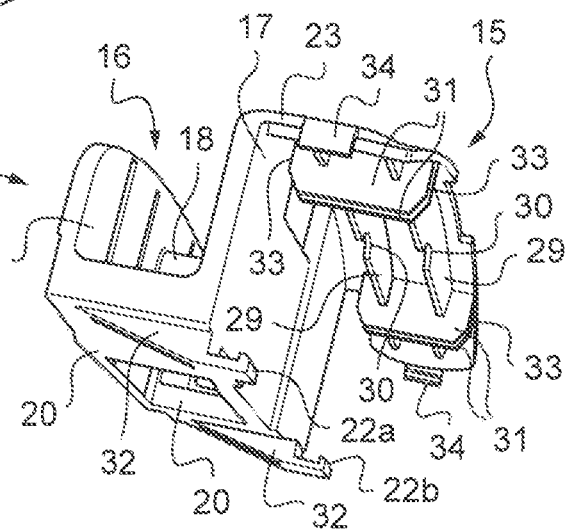

CONNECTOR AND WIPER DEVICE FOR ASSEMBLING A DRIVE ARM OF A MOTOR VEHICLE TO A WINDSCREEN WIPER

The present invention relates to a connector for assembling a drive arm of a motor vehicle to a windscreen wiper. The invention also relates to a wiper device comprising a connector.

Flat blade wipers have the particular feature that they no longer have a compensator structure. They comprise at least one spine that gives the wiper blade rigidity so as to help with pressing said blade on the windscreen of the vehicle. Said spine is curved and the curvature thereof keeps the blade pressed against the windscreen, even at the longitudinal ends of the wiper.

These wipers are connected to drive arms of suitable form which are driven in an angular back-and-forth movement. Note, in this regard, that there are various different types of drive arms, such as hook arms, arms with a side hinge pin, arms with a longitudinal clip-on mechanism, etc.

The wiper is attached to the drive arm by two types of connection means, namely means for connecting the drive arm to a connector, either directly or indirectly via an adapter, and means for assembling and locking the connector to the wiper.

Moreover, usually, there are two types of connector for connecting a drive arm to the wiper: either a side lock or side hook connector, or a top lock connector.

A side lock or side hook connector comprises connection means offset to the side for connecting the drive arm to the connector. However, the locking of the offset connection means may not be sufficiently stable, allowing the connector to move unduly with respect to the wiper.

It is an aim of the present invention to offer a side lock or side hook connector in which the offset connection means may be locked with greater stability.

To this end, the invention relates to a connector for assembling a drive arm of a motor vehicle to a windscreen wiper, said connector comprising:
  a connection device designed to interact with a base of a windscreen wiper to reversibly secure the connector to the windscreen wiper,
  a side interface on a side wall of the connection device, said interface comprising a second transverse pin designed to be connected to a drive arm,
characterized in that the connection device comprises a first member designed to interact with a housing in the base of the windscreen wiper, the first member being connected to the side wall by at least one bridge.

The first member may be a cover designed to close the housing.

The first member may have at least one retention means designed to be inserted in the housing to interact with at least one member of the housing.

The connector may thus be stably assembled to the wiper. Moreover, in the assembled state, the retention means is protected inside the housing.

According to one embodiment, at least one side locking tab of the connection device projects perpendicularly from the side wall in the direction of the housing, the side locking tab being designed to interact with a side edge of the windscreen wiper arranged on the opposite side to the housing. The connection device thus comprises for example two side locking tabs located at the longitudinal ends of the side wall.

On the lower side of the wiper, opposite the side on which the base is located, the side locking tabs clip onto the side edge of the flank of the wiper. This clipping is made possible by the fact that the retention means hold the first member in place on the base. The connector is thus locked both at the top and at the bottom, thereby ensuring that the connector is held stably and durably on the wiper.

According to one or more features of the connector, taken alone or in combination:
  the connection device comprises a retention means designed to interact by snap-fitting with at least one member arranged inside the housing in the base of the windscreen wiper,
  the retention means comprises at least one pair of elastic tabs designed to interact by snap-fitting with a first transverse pin arranged inside the housing,
  the elastic tabs are made in a substructure of the connection device fixed under the first member, the substructure taking the form of a frame, a pair of elastic tabs being formed in each longitudinal wall of the frame,
  the connection device comprises a retention means with two elastic hooks arranged at the two longitudinal ends of the first member, each elastic hook being designed to interact with a complementary transverse cylindrical peg arranged inside the housing,
  the connection device comprises a retention means with at least two side faces which are opposite one another and configured so as to come into abutment against side walls of the housing,
  the connection device comprises at least one pair of flanges, each flange having two opposite side faces,
  the side interface has at least one stiffening rib connecting a bottom of the interface with the back of a side locking tab,
  the connection device comprises at least one reinforcing plate on the first member, the reinforcing plate being designed to be inserted in the housing in the base, a notch with a cylindrical bottom, complementary to a first transverse pin of the housing, being made in the reinforcing plate to guide the connection device in the base.

The invention also relates to a wiper device, characterized in that it comprises a connector as described above.

The details of the invention and how it may be carried out shall become clearer from the following description with reference to the attached drawings, which are to be considered non-limiting examples.

FIG. 3 shows a perspective view of the wiper device of FIG. 2 in the disassembled state.

FIG. 4 shows a perspective view from below of a connector for the wiper device of FIG. 3.

FIG. 5 shows an end-on view of the wiper device of FIG. 3 in the assembled state.

FIG. 6 shows a view from below of the wiper device of FIG. 5.

FIG. 7 shows a perspective view of a second embodiment of a wiper device in the disassembled state.

FIG. 8 shows a perspective view of the connector for the wiper device of FIG. 7.

Figure 1:
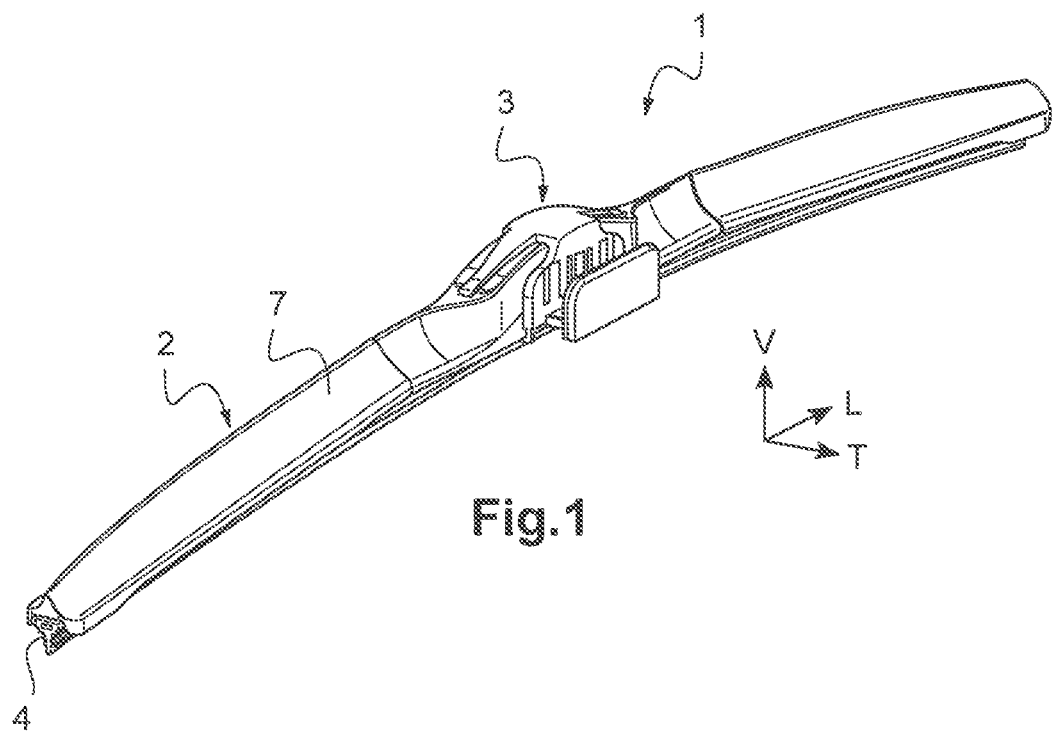
FIG. 1 shows a perspective view of a wiper device.

The rest of the description shall refer, in a non-limiting manner, to the longitudinal, vertical and transverse directions indicated in FIG. 1 by the trihedron (L, V, T) fixed with respect to the windscreen wiper 2. The longitudinal direction L corresponds to the main direction of the windscreen wiper 2 when flat.

Identical or similar elements shall be designated by the same reference numerals.

The following embodiments are examples. Although the description refers to one or more embodiments, this does not necessarily mean that each reference concerns the same embodiment, or that the features apply only to a single embodiment. Individual features from different embodiments may also be combined or interchanged to make further embodiments.

Figure 2:
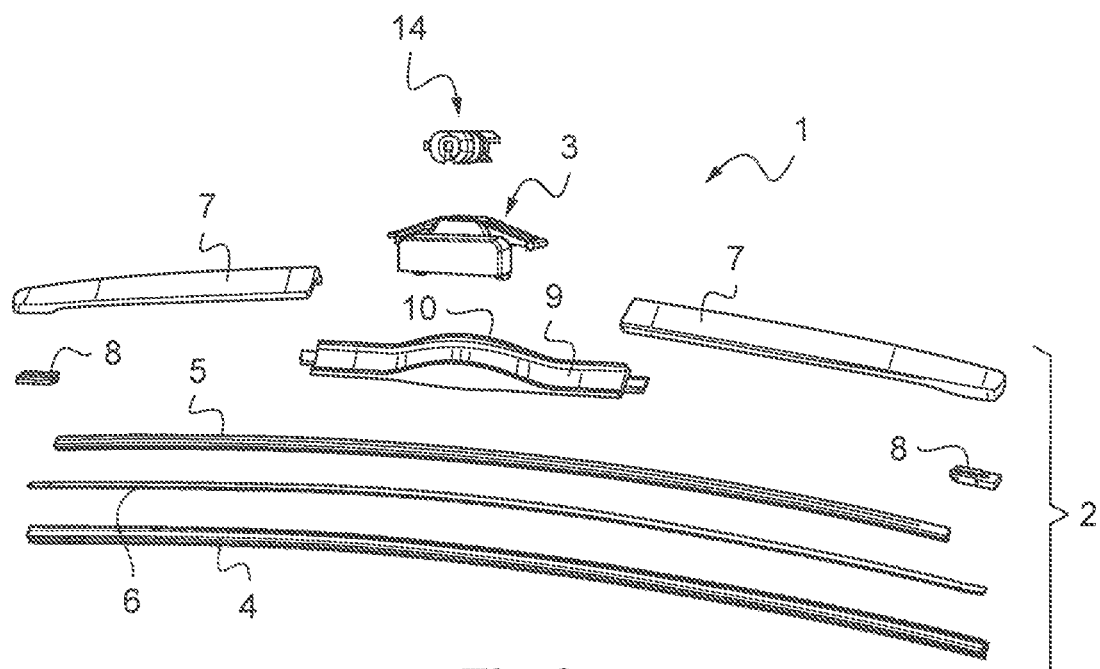
FIG. 2 shows an exploded perspective view of the wiper device of FIG. 1.

FIGS. 1 and 2 show a general view of a wiper device 1 comprising a windscreen wiper 2 and a connector 3 designed to assemble a drive arm of a motorized wiper mechanism of a motor vehicle to the windscreen wiper 2.

The windscreen wiper 2 is a flat blade wiper, the main orientation of which is longitudinal L when laid flat.

The wiper 2 comprises a wiper blade 4, a support mount 5 and at least one longitudinal spine 6. In this embodiment, the spine 6 and the wiper blade 4 are held by the support mount 5.

The wiper 2 further comprises a spoiler 7 which is shaped aerodynamically so that the relative wind that is produced by the movement of the vehicle produces a force that tends to press the windscreen wiper 2 on the windscreen. The spoiler 7 is for example made up of two parts which are assembled to the support mount 5 on either side of the connector 3.

The spoiler 7 and the wiper blade 4 are made of flexible material. They may be made by moulding or extrusion of one or more materials.

The spine 6 is for example made up of a one-piece body comprising for example a flat metal strip which is in particular curved vertically, giving the wiper 2 a curved shape so that the pressing forces exerted by the drive arm are distributed all along the length of the wiper blade 4 when the windscreen wiper 2 is resting on the windscreen of the vehicle.

Each longitudinal end of the windscreen wiper 2 has an end fitting 8 that locks the spine 6 and the wiper blade 4 in terms of longitudinal sliding with respect to the support mount 5 and the spoiler 7.

In this embodiment, the wiper 2 further comprises a central mount 9 comprising a base 10 in which a housing 11 is made. A first transverse pin 12 is arranged inside the housing 11. The transverse pin 12 lies perpendicularly between two parallel longitudinal walls 13 of the housing 11.

The central mount 9 is articulated to the spoilers 7 and also has an aerodynamically formed shape. Although not shown, the spoilers 7 and the central mount 9 may also be made as a single part, with the base 10 integrated in the wiper 2 or in a platform secured to the wiper 2.

To assemble a drive arm to the windscreen wiper 2, the wiper device 1 comprises a connector 3.

The connector 3, which can be seen more clearly in FIGS. 3 to 6, comprises a connection device 15 and a side interface 16 on a side wall 17 of the connection device 15.

The side interface 16 comprises a second transverse pin 18, similar to the first transverse pin 12. The pins 12, 18 may be connected, directly or by means of an adapter 14 (FIG. 2), to a drive arm.

For each type of attachment for the drive arm, such as hook arms, arms with a side hinge pin, arms with a longitudinal clip-on/snap-on mechanism, etc. there will be a special adapter 14 but each of these adapters 14 adapts to the same connector 3 via a standard interface.

The second transverse pin 18 is arranged perpendicularly between the first side wall 17 and a second side wall 19 of the interface 16, parallel to the first transverse pin 12 (FIGS. 3 and 5), The side was 17, 19 are parallel to one another and are connected at the bases thereof by a bottom 20 composed of at least one transverse bar or plate, so as to form a housing of U-shaped cross section.

The side interface 16 thus makes it possible to laterally shift the transverse pin connected to the drive arm (referred to as side-lock or side-hook).

The connection device 15 is designed to interact with the base 10 of the wiper 2 so as to reversibly secure the connector 3 to the windscreen wiper 2.

To this end, the connection device 15 comprises a first member 26 connected to the side wall 17 by at least one bridge 23, the first member 26 being designed to interact with the housing 11 of the base 10 of the windscreen wiper 2. The bridge 23 extends for example substantially perpendicular to the side wall 17.

The first member 26 is far example a cover designed to close the housing 11.

The first member 26 may have at least one retention means designed to be inserted in the housing 11 to interact with at least one member of the housing 11. In the assembled state, the retention means is thus protected inside the housing 11.

FIGS. 3 to 6 show a first embodiment of the connector 3.

In this example, the connection device 15 comprises at least one retention means 21a, 21b, 27a, 27b designed to interact by snap-fitting with at least one member 12, 28a, 28b arranged inside the housing 11 in the base 10 of the windscreen wiper 2.

The retention means comprises for example at least one pair of elastic tabs 21a, 21b designed to interact by snap-fitting with the first transverse pin 12 arranged inside the housing 11 in the base 10 of the windscreen wiper 2 (FIGS. 3 and 4). The gap between the facing elastic tabs 21a, 21b defines for example a generally cylindrical shape complementary to a cross section of the first transverse pin 12.

The elastic tabs 21a, 21b are for example made in a substructure 25 of the connection device 15 fixed under the first member 26, the substructure 25 taking the form of a frame, a pair of elastic tabs 21a, 21b being formed in each longitudinal wall of the frame (FIG. 4). In the assembled state, the substructure 25 is fully inserted in the housing 11. The elastic tabs 21a, 21b are thus protected and concealed inside the housing 11.

The connection device 15 may comprise a retention means with two elastic hooks 27a, 27b arranged at the two longitudinal ends of the first member 26, each elastic hook 27a, 27b being designed to interact with a complementary transverse cylindrical peg 28a, 28b arranged inside the housing 11. The cylindrical pegs 28a, 28b lie in the transverse direction T and are arranged in two small recesses at the two ends of the housing 11 in the base 10, in the upper part of the housing 11.

The connection device 15 may further comprise at least one reinforcing plate 29 on the first member 26, the reinforcing plate 29 being inserted in the housing 11 when the connector 3 is in the assembled state. The reinforcing plate 29 extends in the longitudinal direction, for example, along the first member 26. The reinforcing plate 29 passes through the substructure 25, for example.

A notch 30 with a cylindrical bottom, complementary to the first transverse pin 12 of the housing 11, may be made in the reinforcing plate 29 so as to interact with the first transverse pin 12 in order to guide the longitudinal positioning of the connector 3 and act as a stop means on the axis of insertion of the connector 3.

The connection device 15 may comprise a retention means with at least two side faces 33 which are opposite one another and configured so as to come into abutment against the side walls 13 of the housing 11. The side faces 33 may be connected by a transverse plate arranged perpendicularly to the reinforcing plates 29.

The side-lock or side-hook connector 3 may thus be secured stably and reversibly to the base 10 of the wiper 2 by one or more retention means connected to the wiper 2 on the upper side of the wiper.

The securing device 15 may also comprise at least one side locking tab 22a, 22b projecting perpendicularly from the side wall 17 in the direction of the housing 11 in the base 10, the side locking tab 22a, 22b being designed to interact with a side edge 24 of the windscreen wiper 2 arranged on the opposite side to the housing 11, on the lower side if it is considered that the housing 11 opens out in the upper part of the wiper 2.

In the example, the connection device 15 comprises two side locking tabs 22a, 22b arranged at the longitudinal ends of the side wall 17. The side locking tabs 22a, 22b are the same length and may be the same width.

Just one side locking tab may be provided, in particular in the middle of the lower end of the side wall 17. More than two locking tabs may also be provided, along the lower end of the side wall 17, spacing them apart evenly.

Thus, in use, when a user assembles the connector 3 to the wiper 2, he presses on the first member 26 of the connector 3, inserting the first transverse pin 12 between the elastic tabs 21a, 21b of the connector 3 which hold it in place by snap-fitting. The elastic hooks 27a, 27b interact with a complementary transverse cylindrical peg 28a, 28b in the housing 11. The first member 26 may thus be held in place on the wiper 2.

The first transverse pin 12 designed to be connected to a drive arm in a top-lock device is thus used as a connection member for connecting the wiper 2 to the connector 3 in the side-lock or side-hook device. The connector 3 is thus secured directly on the first transverse pin 12 in the place of the adapter 14.

On the lower side of the wiper 2, opposite the side on which the base 10 is located, the side locking tabs 22a, 22b clip onto the side edge 24 of the flank of the wiper 2. This capping is made possible by the fact that the retention means 21a, 21b hold the first member 26 in place on the base 10. The connector 3 is thus locked both at the top and at the bottom, thereby ensuring that the connector 3 is held stably and durably on the wiper 2.

FIGS. 6 and 7 show a second embodiment of the connector 3.

As in the first embodiment, the connector 3 may comprise at least one reinforcing plate 29 on the first member 26, extending in the longitudinal direction and being inserted in the housing 11 when the connector 3 is in the assembled state. A notch 30 with a cylindrical bottom, complementary to the first transverse pin 12, may be made in the reinforcing plate 29 so as to guide the positioning of the connector 3. Thus, for example, there are two reinforcing plates 29 arranged in parallel under the first member 26.

In this example, the retention means is not designed to interact by snap-fitting with the housing 11 in the base 10.

The connector 3 may however comprise two tabs 34 arranged at the two longitudinal ends of the first member 26 so as to hide the small recesses at the two ends of the housing 11 in the base 10, in the upper part of the housing 11, without clipping.

A retention means for retaining the connection device 15 comprises at least one flange 31 with two opposite side faces 33, configured so as to come into abutment against the side walls 13 of the housing 11.

Two pairs of parallel flanges 31 are for example arranged under the first member 26, each pair being interposed between the notch 30 and a tab 34.

The securing device 15 also comprises at least one side locking tab 22a, 22b projecting perpendicularly from the side wall 17 in the direction of the housing 11 in the base 10, the side locking tab 22a, 22b being designed to interact with a side edge 24 of the windscreen wiper 2 arranged facing the housing 11.

Also in this embodiment, the side interface 16 of the connector 3 has at least one stiffening rib 32 connecting the bottom 20 of the interface 16 with the back of a side locking tab 22a, 22b. Two stiffening ribs 32, which are flat and parallel, thus connect, for example, each side locking tab 22a, 22b to the bottom 20 of the interface 16.

Thus, in use, when a user assembles the connector 3 to the wiper 2, he presses on the first member 26 of the connector 3, inserting the flanges 31 in the housing 11, the side faces 33 of the flanges 31 coming into abutment against the housing 11.

On the lower side of the wiper 2, the side locking tabs 22a, 22b clip onto the side edge 24 of the flank of the wiper 2. This clipping is made possible by deformation of the bridge 23 and by the first member 26 being immobilized in the base 10 by the retention means. The connector 3 is thus locked both at the tap and at the bottom, thereby ensuring that the connector 3 is held stably and durably on the wiper 2.

Figure 9:
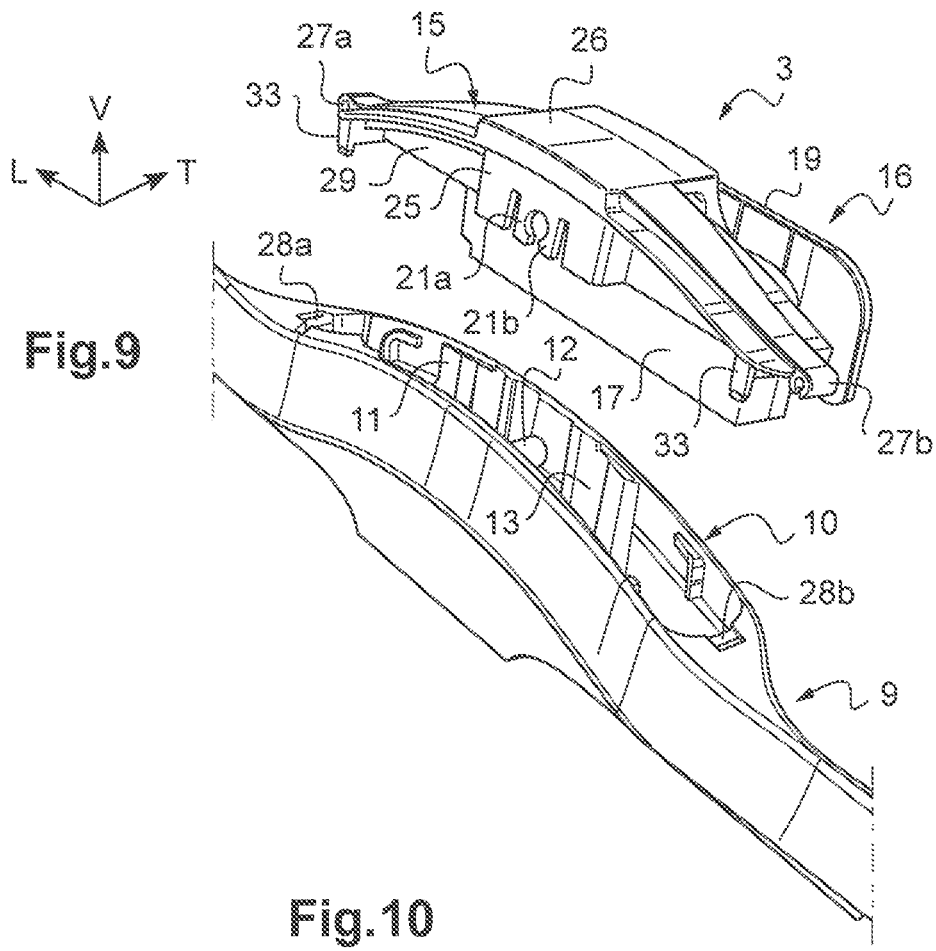
FIG. 9 shows a perspective view of a third embodiment of a wiper device in the disassembled state.
Figure 10:
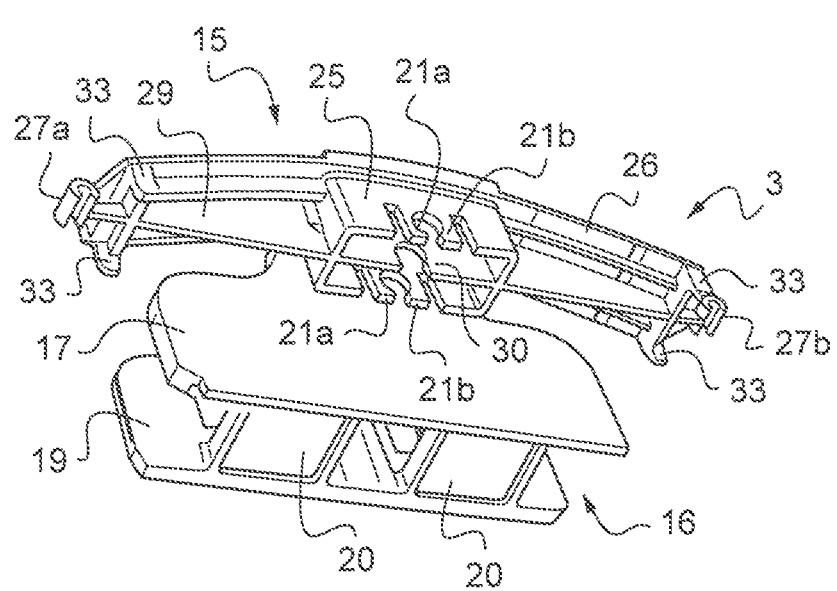
FIG. 10 shows a perspective view from below of a connector for the wiper device of FIG. 9.

FIGS. 9 and 10 show a third embodiment of the connector 3.

As in the first embodiment, in this embodiment, the connection device 15 comprises at least one retention means 21a, 21b, 27a, 27b designed to interact by snap-fitting with at least one member 12, 28a, 28b arranged inside the housing 11 in the base 10 of the windscreen wiper 2.

The retention means comprises for example at least one pair of elastic tabs 21a, 21b designed to interact by snap-fitting with the first transverse pin 12 arranged inside the housing 11 in the base 10 of the windscreen wiper 2.

The retention means may comprise two elastic hooks 27a, 27b arranged at the two longitudinal ends of the first member 26, each elastic hook 27a, 27b being designed to interact with a complementary transverse cylindrical peg 28a, 28b arranged inside the housing 11.

The retention means may comprise at least two side faces 33 which are opposite one another and configured so as to come into abutment against the side walls 13 of the housing 11.

These retention means are sufficient to secure the connector 3 stably and reversibly to the base 10 of the wiper 2. Indeed, in this third embodiment, the securing device 15 does not comprise any side locking tabs 22a, 22b.

The invention claimed is:

1. A connector for assembling a drive arm of a motor vehicle to a windscreen wiper, said connector comprising:
   a connection device configured to interact with a base of a windscreen wiper to reversibly secure the connector to the windscreen wiper; and
   a side interface on a side wall of the connection device, said side interface comprising a second transverse pin configured to be connected to a drive arm, wherein the connection device comprises:
- a first member configured to interact with a housing in the base of the windscreen wiper, the first member being connected to the side wall by at least one bridge, and
- at least one side locking tab projecting perpendicularly from the side wall in a same direction as the bridge extends from the side wall, and wherein the side locking tab is configured to interact with a side edge of the windscreen wiper arranged on an opposite side to the housing.

2. The connector according to claim 1, wherein the connection device comprises two side locking tabs located at longitudinal ends of the side wall.

3. The connector according to claim 1, wherein the connection device comprises a retention means configured to interact by snap-fitting with at least one member arranged inside the housing in the base of the windscreen wiper.

4. The connector according to claim 3, wherein the retention means comprises at least one pair of elastic tabs configured to interact by snap-fitting with a first transverse pin arranged inside the housing.

5. The connector according to claim 4,
wherein the at least one pair of elastic tabs are made in a substructure of the connection device fixed under the first member, the substructure taking the form of a frame, and
wherein the at least one pair of elastic tabs comprises a pair of elastic tabs being formed in each longitudinal wall of the frame.

6. The connector according to claim 1, wherein the connection device comprises a retention means with two elastic hooks arranged at two longitudinal ends of the first member, each elastic hook being designed to interact with a complementary transverse cylindrical peg arranged inside the housing.

7. The connector according to claim 1, wherein the connection device comprises a retention means with at least two side faces which are opposite one another and configured so as to come into abutment against side walls of the housing.

8. The connector according to claim 7, wherein the connection device further comprises at least one pair of flanges, each flange having two opposite side faces.

9. The connector according to claim 1, wherein the side interface has at least one stiffening rib connecting a bottom of the interface with the back of a side locking tab.

10. The connector according to claim 1, wherein the connection device comprises at least one reinforcing plate on the first member, the reinforcing plate being designed to be inserted in the housing in the base, a notch with a cylindrical bottom, complementary to a first transverse pin of the housing, being made in the reinforcing plate to guide the connection device in the base.

11. The connector according to claim 1, wherein the first member is a cover designed to close the housing.

12. The connector according to claim 1, wherein the first member has at least one retention means designed to be inserted in the housing to interact with at least one member of the housing.

13. A wiper device comprising a connector according to claim 1.

* * * * *